Aug. 11, 1936.   L. E. ALEXANDER   2,050,251
WHEEL LOCKING ATTACHMENT FOR TRUCKS
Filed Dec. 4, 1934
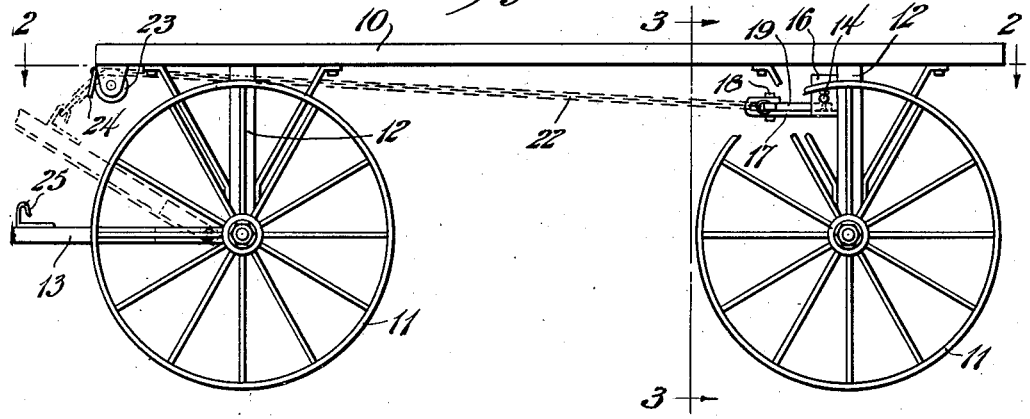
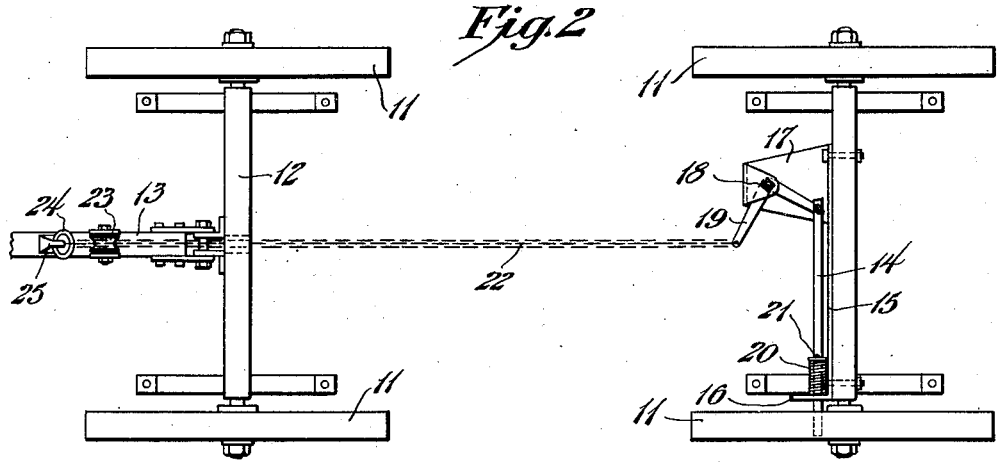
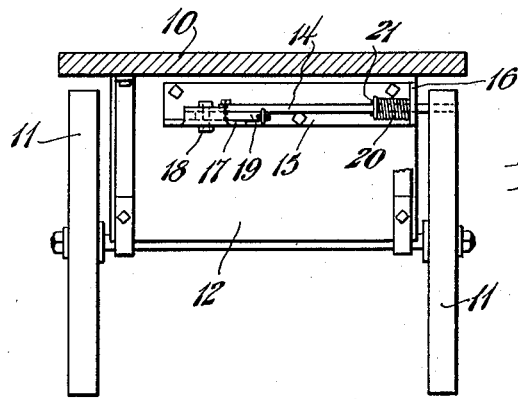
INVENTOR
L. E. Alexander
BY Philip E. Liggers
ATTORNEY Patented Aug. 11, 1936

2,050,251

UNITED STATES PATENT OFFICE 2,050,251

WHEEL LOCKING ATTACHMENT FOR TRUCKS

Lloyd E. Alexander, Shelby, Mont.

Application December 4, 1934, Serial No. 755,976

1 Claim. (Cl. 188—119)

This invention relates to wheel locking devices or brakes for baggage trucks and the like and, among other objects, aims to provide an improved and very simple locking bar attachment having a flexible pull element adapted to be connected to a truck tongue not only to hold the tongue in raised position but arranged to actuate the locking bar automatically by the weight of the tongue. The idea is to insure that the wheel lock or brake is applied when the vehicle is left standing and the tongue is hung up and that it will be automatically released when the tongue is released from the pull element and swung down.

Other aims and advantages of the invention will appear in the specification, when considered in connection with the accompanying drawing, wherein:

Fig. 1 is a side elevation of a baggage truck having the preferred form of locking device applied thereto;

Fig. 2 is a top plan view of the truck chassis, taken on the line 2—2 of Fig. 1; and Fig. 3 is a sectional view taken on the line 3—3 of Fig. 1.

It is exceedingly important that reliable means be employed to prevent baggage trucks from rolling on railroad tracks when they are left in loading or unloading positions. Such trucks are usually manually operated and are provided with pivoted tongues. It is an important aim of this invention to provide a relatively simple wheel locking appliance that can be easily attached to ordinary trucks of this type and so constructed as to utilize the tongue to operate the locking means.

Referring particularly to the drawing, there is shown a truck having a flat platform 10 and spoked front and rear wheels 11. The usual bolsters 12 are arranged between the axles and the platform. To the front axle, which is generally connected to the bottom of the front bolster by means of an ordinary fifth wheel, there is connected the usual pivoted tongue 13 to swing in a vertical plane.

Preferably, the wheel locking mechanism of this invention is supported on the front face of the rear bolster 12. Herein, a reciprocable locking bar or rod 14 is carried by a bracket 15 which conveniently consists of a metal plate having a forwardly extending or bent flange 16 through which the bar is guided so that its end may be projected between spokes of one of the rear wheels 11. If desired, the end portion of the bar may be covered with a rubber nipple (not shown), to prevent it from marring wooden spokes. On the other end of the bracket there is shown a horizontal or forwardly extending flange 17 which is reversely bent to receive a pivot bolt or pin 18 carrying a bell-crank lever 19 connected to the opposite end of the bar or rod 14 (Fig. 2). The arrangement is such that the bell-crank, when moved clockwise as viewed in Fig. 2, will force the bar outwardly and apply the brake. A coil spring 20 is arranged between the flange 16 and a pin 21 in the bar and is adapted to retract the bar when no pull is exerted on the bell-crank arms.

To operate the bell-crank and apply the locking device or brake, there is shown a flexible pull element in the form of a chain 22 projecting forwardly under the platform 10 and through the front bolster 12. In this example, the chain passes over a grooved sheave 23 mounted below the platform at the front end and the chain has an attaching ring 24 which prevents it from pulling through the sheave and also provides convenient means for connecting the chain to a suitable hook 25 on the tongue. The arrangement is such that when the tongue is raised or lifted to the position shown in dotted lines in Fig. 1, the ring 24 of the chain is inserted in the hook and the tongue raised. The weight of the tongue pulls the chain over the sheave and moves the bell-crank so as to apply or operate the locking bar against the compression of the spring 20. Furthermore, the chain will support the tongue in its elevated position and the locking device cannot be released until the tongue is raised and the chain ring removed from the hook. In other words, as long as the tongue is swung up or suspended, the locking device is applied. Hence, no manual operation is required. It is applied and released automatically.

From the foregoing description, it will be seen that the attachment is very simple; that it is easy to apply to any ordinary truck; that there are no delicate parts which are apt to get out of order and require quick replacement; that its operation is easy to understand; that there is no chance to forget to apply the brake before leaving the truck; and that the mechanism is very compact and inexpensive to manufacture.

Obviously, the present invention is not restricted to the particular embodiment thereof herein shown and described.

What is claimed is:

In combination with a baggage truck having a platform, front and rear wheels, a bolster and a pivoted tongue attached to the front wheels, a supporting frame adapted to be connected to the truck bolster; a locking bar projecting through one end of the frame into the path of the spokes of one of the wheels; a bell-crank connected to the locking bar; a spring normally retracting the locking bar from the path of the spokes; a chain connected to the bell-crank and having a ring on its forward end arranged adjacent to the front end of the platform of the truck; and a hook on the tongue of the truck adapted to engage the chain and operate the locking device automatically when the tongue is suspended in raised position by said chain.

LLOYD E. ALEXANDER.